United States Patent [19]
Mita

[11] Patent Number: 5,456,994
[45] Date of Patent: Oct. 10, 1995

[54] BATTERY MODULE AND TEMPERATURE-CONTROLLING APPARATUS FOR BATTERY

[75] Inventor: Yoshinori Mita, Tokorozawa, Japan

[73] Assignee: Honda Giken Kogyo Kabushiki Kaisha, Tokyo, Japan

[21] Appl. No.: 73,159

[22] Filed: Jun. 7, 1993

[30]   Foreign Application Priority Data

Jun. 8, 1992 [JP] Japan .................. 4-173786

[51] Int. Cl.$^6$ .................................. H01M 10/50
[52] U.S. Cl. .................. 429/71; 429/120; 429/148
[58] Field of Search .................. 429/120, 71, 158, 429/148, 156

[56]             References Cited
U.S. PATENT DOCUMENTS

| | | | |
|---|---|---|---|
| 1,112,861 | 10/1914 | Snyder | 429/71 |
| 1,152,247 | 8/1915 | Walker | 429/120 |
| 3,923,549 | 12/1975 | Mabuchi et al. | 429/148 X |
| 4,897,322 | 1/1990 | Jessen | 429/120 X |

FOREIGN PATENT DOCUMENTS 2138858  11/1990  Japan .
3291867  12/1991  Japan .

OTHER PUBLICATIONS

English language portions of Japanese Publications 2-138858 Nov. 1990 and 3-291867 Dec. 1991.

*Primary Examiner*—John S. Maples
*Attorney, Agent, or Firm*—Lyon & Lyon

[57]             ABSTRACT

The temperature-controlling apparatus for a battery is constituted by a battery casing, a plurality of battery modules and a partition wall. The battery casing is provided with an inlet opening on a front side thereof and an outlet opening on a rear side thereof. Each battery module has spacers having a plurality of vertical pores and are disposed in the battery casing. The partition wall is disposed in a lower portion of the battery casing for defining a chamber communicating with the inlet opening. The partition wall is provided with transverse ridges for supporting the battery modules with their side edge portions and a flat portion having a plurality of pores penetrating the partition wall. By this structure, the temperature-controlling medium introduced into the battery casing flows through the pores of the partition wall and the vertical pores of the spacers.

8 Claims, 7 Drawing Sheets

BATTERY MODULE AND TEMPERATURE-CONTROLLING APPARATUS FOR BATTERY

BACKGROUND OF THE INVENTION

The present invention relates to a battery module and a temperature-controlling apparatus therefor, and more specifically to a battery module capable of effectively conducting the temperature control of each battery cell and a temperature-controlling apparatus therefor.

Widely used as energy sources for electric vehicles, etc. are wet-type secondary batteries which can be rechargeable by chemical reaction and thus repeatedly reusable. Such secondary batteries which may be called rechargeable batteries are exemplified by nickel-cadmium batteries (Ni—Cd batteries). Recently, higher attention has been paid to nickel-hydrogen batteries which have higher energy density than the nickel-cadmium batteries. In the nickel-hydrogen batteries, nickel or nickel hydroxide is used as a positive pole, and a metal hydride (hydrogen storage alloy) is used as a negative pole.

In such a wet-type rechargeable battery, the battery efficiency decreases as the temperature increases. Accordingly, heat generated in charge and recharge cycles should be removed as much as possible.

Figure 10:
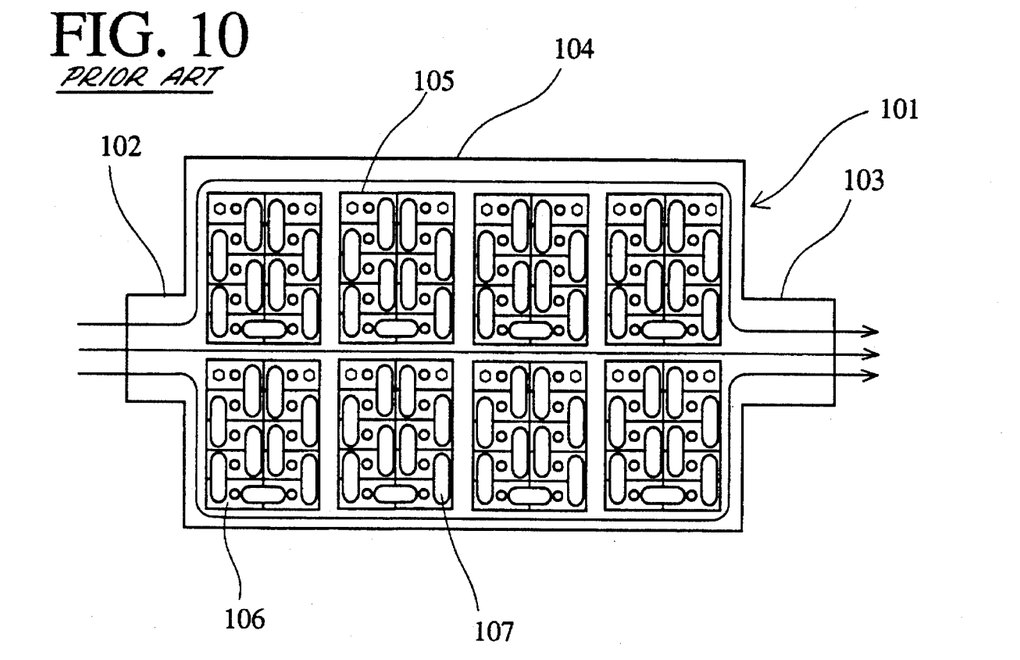
FIG. 10 is a plan view showing the conventional temperature-controlling apparatus for battery modules.

One example of an apparatus for cooling such a battery is schematically shown in FIG. 10. In FIG. 10, a battery 101 comprises a rectangular battery casing 104 having an inlet opening 102 for a cooling medium on a front side thereof, an outlet opening 103 for the cooling medium on a rear side thereof, and a plurality (2×4 in this example) of battery modules 105 disposed in the battery casing 104. In the figure, connections between each battery module 105 are omitted. Each battery module 105 is constituted by two sets of assemblies each composed of a plurality (5 in this example) of rectangular battery cells 106, which are bound integrally. Each battery cell 106 is connected in series via connection plates 107.

In such a temperature-controlling apparatus, the cooling medium introduced through the inlet opening 102 flows between the battery modules 105 in the battery casing 104 and is discharged through the outlet opening 103.

Figure 11:
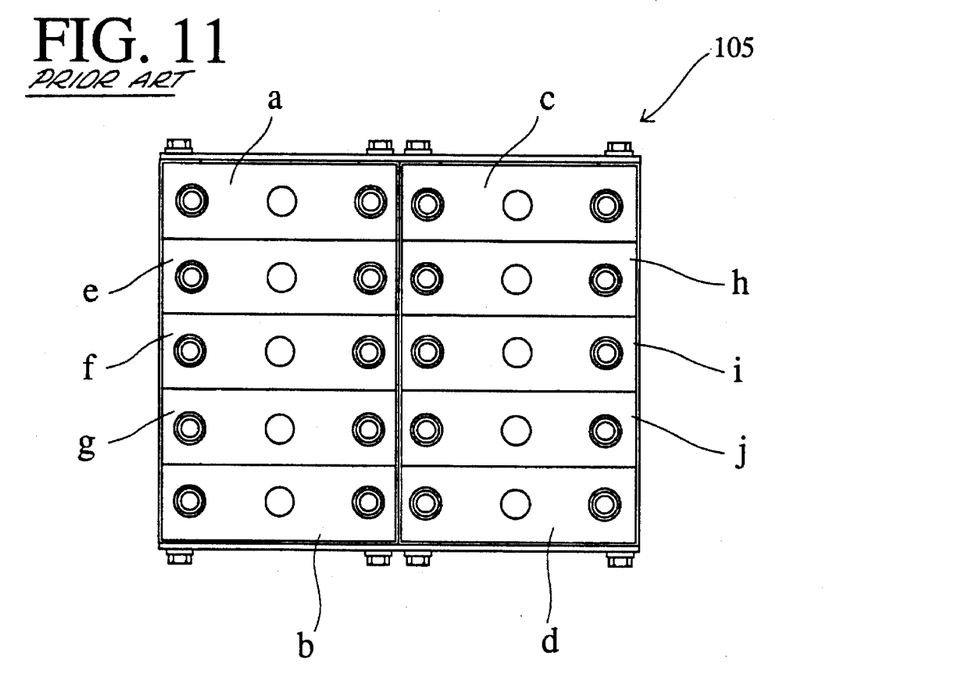
FIG. 11 is a plan view showing the conventional battery module.

The battery module 105 used in the above apparatus has a structure as shown in FIG. 11. Among battery cells a–j in the battery module 105, battery cells a–d disposed on both ends are well cooled by the cooling medium due to good contact therebetween, while battery cells e–j disposed inside the battery module 105 are not well cooled. Thus, it may be considered to provide a gap between adjacent battery cells, but such a structure would lead to the easy deformation of the battery cells when internal pressure increases in each battery cell in the process of charging or recharging. In order to prevent such deformation, a casing of the battery cells should be thick, which in turn results in an undesirable increase in the weight and volume of the battery module.

On the other hand, to prevent a decrease in initial potential of the wet-type rechargeable battery in cold areas or in the winter seasons, the battery should be warmed. In such a case, a heated medium should be introduced into the battery casing through the inlet opening thereof in order to uniformly heat the battery cells.

OBJECT AND SUMMARY OF THE INVENTION

Accordingly, an object of the present invention is to provide a battery module capable of efficiently controlling the temperature of each battery cell.

Another object of the present invention is to provide a temperature-controlling apparatus for such battery modules.

As a result of intense research in view of the above object, the inventors has found that by disposing a spacer having a large number of pores vertically penetrating the spacer between each adjacent pair of a plurality of battery cells, and by causing a temperature-controlling medium to flow through the pores, each battery cell in the battery module can efficiently be temperature-controlled. Also, it has been found that by disposing a plurality of battery modules in a battery casing provided with an inlet opening on a front side and an outlet opening on a rear side, a partition wall being disposed in an upper or lower portion of the battery casing for defining a chamber communicating with the inlet opening, and the partition wall being provided with transverse ridges for supporting the battery modules and a plurality of pores penetrating the partition wall, the temperature-controlling medium introduced into the battery casing can flow through the pores of the partition wall and the vertical pores of the spacers, thereby efficiently controlling the temperature of each battery cell in the battery module. The present invention has been completed based on these findings.

Thus, the battery module according to the present invention comprises a plurality of battery cells and spacers interposed therebetween, each spacer having a plurality of vertical pores.

The temperature-controlling apparatus for a battery according to the present invention comprises (a) a battery casing provided with an inlet opening for a temperature-controlling medium on a front side thereof and an outlet opening for the temperature-controlling medium on a rear side thereof, (b) a plurality of battery modules having spacers interposed therebetween which are disposed in the battery casing, each spacer having a plurality of vertical pores, and (c) a partition wall disposed in an upper or lower portion of the battery casing for defining a chamber communicating with the inlet opening, the partition wall being provided with transverse ridges for supporting the battery modules with their side edge portions and a flat portion having a plurality of pores penetrating the partition wall, whereby the temperature-controlling medium introduced into the battery casing flows through the pores of the partition wall and the vertical pores of the spacers.

DETAILED DESCRIPTION OF THE INVENTION

The present invention will be explained in detail referring to the attached figures.

Figure 1:
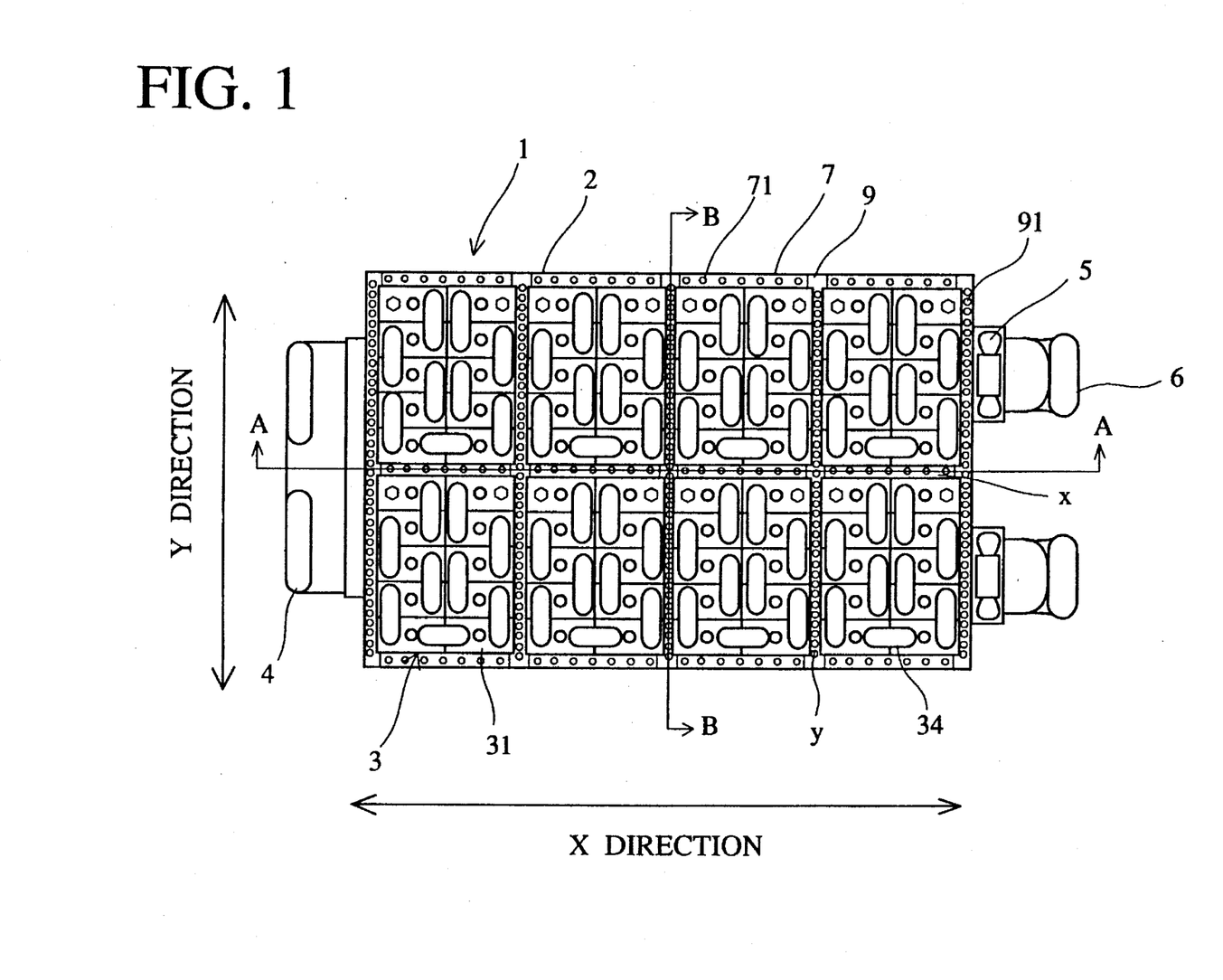
FIG. 1 is a plan view showing the temperature-controlling apparatus for a battery according to one embodiment of the present invention.
Figure 2:
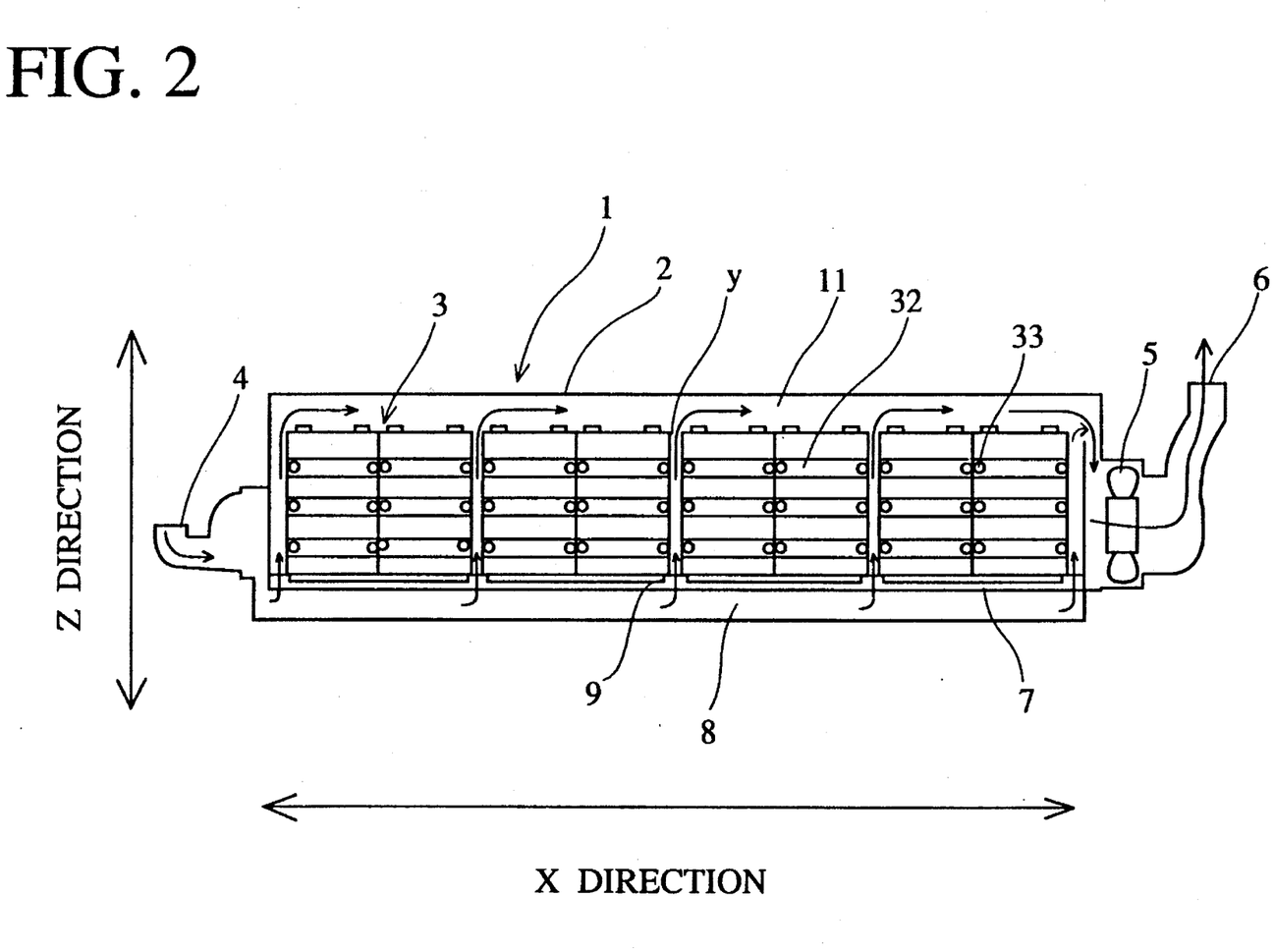
FIG. 2 is a cross-sectional view taken along the line A—A in FIG. 1.
Figure 3:
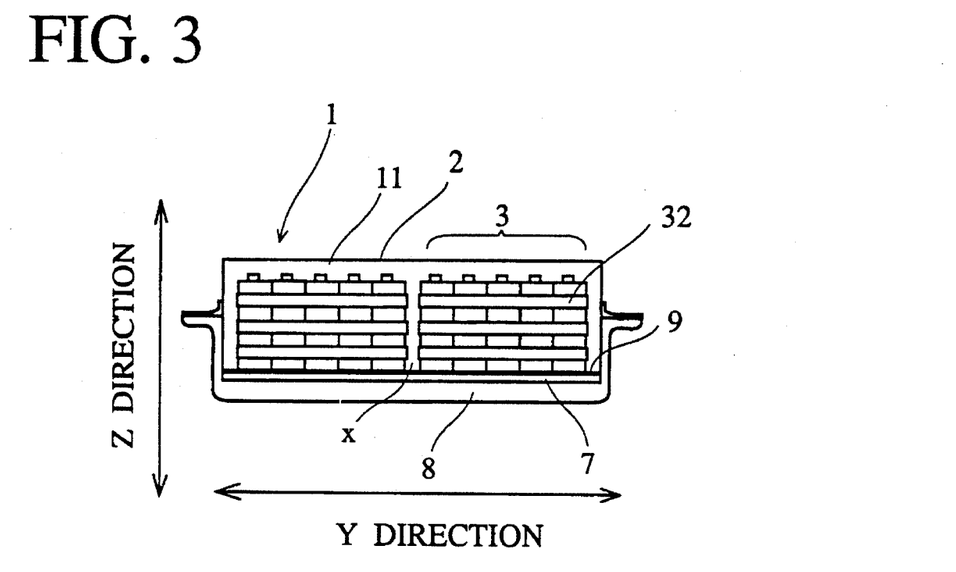
FIG. 3 is a cross-sectional view taken along the line B—B in FIG. 1.
Figure 4:
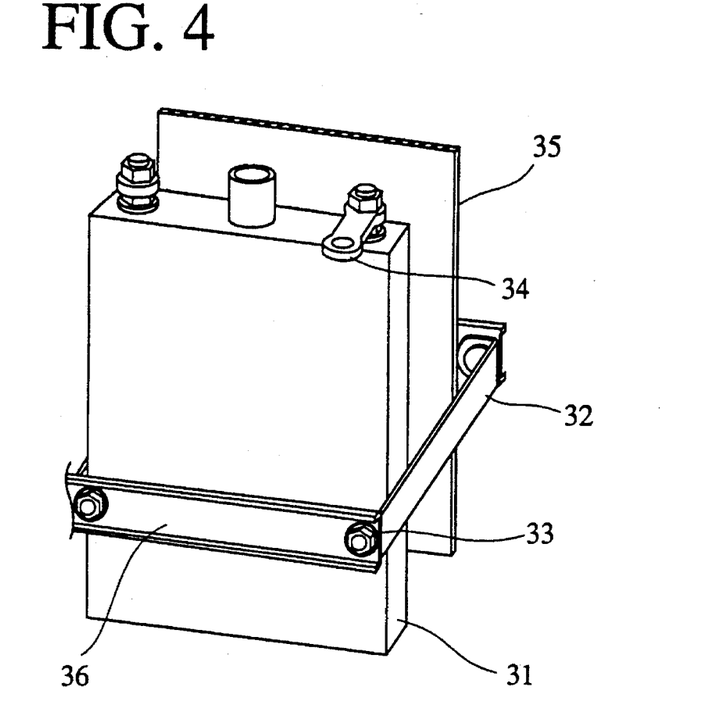
FIG. 4 is a perspective view showing a battery module according to one embodiment of the present invention.
Figure 5:
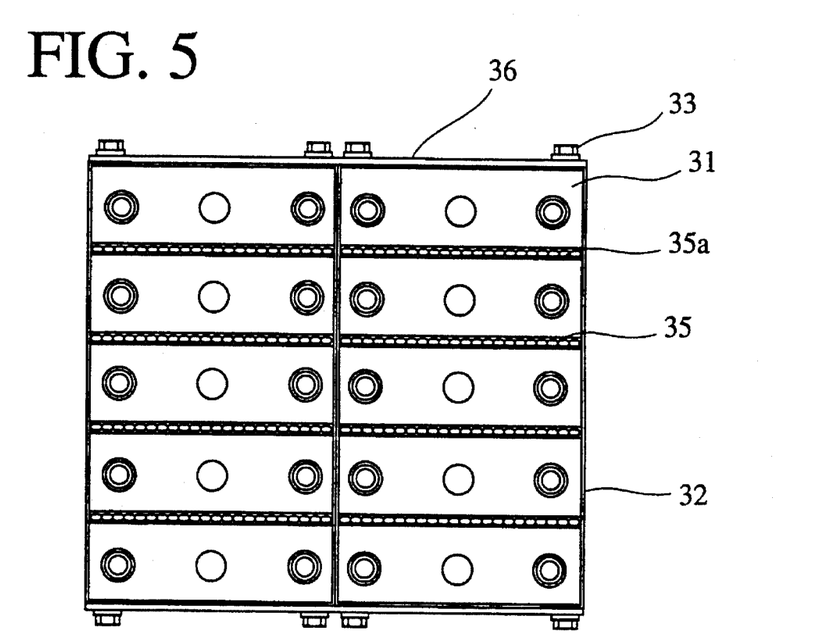
FIG. 5 is a plan view showing the battery module according to one embodiment of the present invention.
Figure 6:
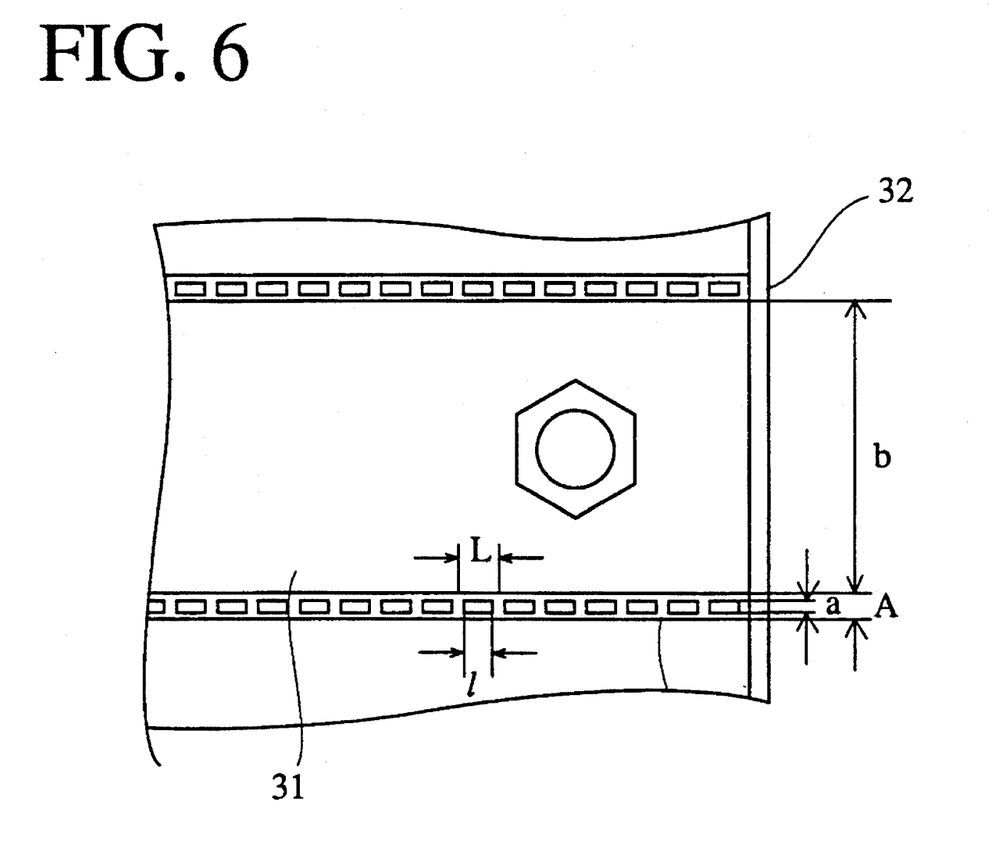
FIG. 6 is a partial enlarged view showing the battery module according to one embodiment of the present invention.

The battery shown in FIGS. 1–3 has a rectangular battery casing 2 and battery module 3 disposed in an arrangement of 2×4 in the battery casing 2. Connections between the battery modules 3 are omitted in FIGS. 1–3. There are longitudinal gaps "x" extending in the direction X parallel to the direction from the inlet opening 4 to the outlet opening 5, and transverse gaps "y" extending in the direction Y parallel to the bottom plate of the battery casing 2 and perpendicular to the above longitudinal direction X. Incidentally, a cover plate of the battery casing 2 is not depicted in FIG. 1 for the convenience of explanation.

As shown in FIGS. 2 and 4–6, the battery module 3 of the present invention is constituted by arranging a plurality (5 in this example) of rectangular battery cells 31 with spacers 35 having a large number of vertical pores 35a interposed between adjacent battery cells 31 to form a battery cell assembly, by disposing two rows of the battery cells assemblies side by side, and by tightly binding the finally assembled battery cells with plural sets of push members 36 arranged on both ends of the finally assembled battery cells and connecting members 32 fixed to the push members 36 by bolts 33. In the battery module 3, electrodes of each battery cell 31 are connected by connection plates 34 in series. In this structure, the spacer 35 functions not only to prevent the deformation of the battery cells 31 due to an increase in their internal pressure, but also to control the temperature of each battery cell 31 by permitting the temperature-controlling medium such as a cooled or heated air to flow through vertical pores 35a thereof as described below. Incidentally, in FIG. 4, only one battery cell and one spacer are shown for the simplicity of explanation.

As long as the spacer 35 having a large number of vertical pores 35a have sufficiently high mechanical strength and pore diameters, it is not restricted to have a particular structure. For instance, the spacer 35 may have a structure in which thin flat plates are bonded to both sides of a thin corrugated plate. The spacer may have a pore width "a" and a battery cell thickness "b", meeting the relation that a ratio of a/b is 0.1 or less. If the ratio of a/b is larger than 0.1, the volume efficiency of the battery module is low, needing a large space, although it provides good cooling capability. Even if the ratio of a/b is lower than 0.1, sufficient cooling capability can be achieved by the structure of the present invention.

Also, with respect to an area S (=A×L) of the spacer 35 necessary for providing one vertical pore 35a and a cross sectional area s (=a×l) of the vertical pore 35a, a ratio of s/S is preferably 0.3 or more. If the ratio of s/S is less than 0.3, the spacer 35 would have an excessively large weight, though it shows improved strength.

The temperature-controlling apparatus of the present invention having a plurality of such battery modules is provided with a battery casing 2 provided with an inlet opening 4 for a temperature-controlling medium on a front side thereof and an outlet opening 6 for the temperature-controlling medium having a air-discharging fan 5 on a rear side thereof; and a partition wall 7 disposed in a lower portion of the battery casing 2 for defining a chamber 8 communicating with the inlet opening 4.

Figure 7:
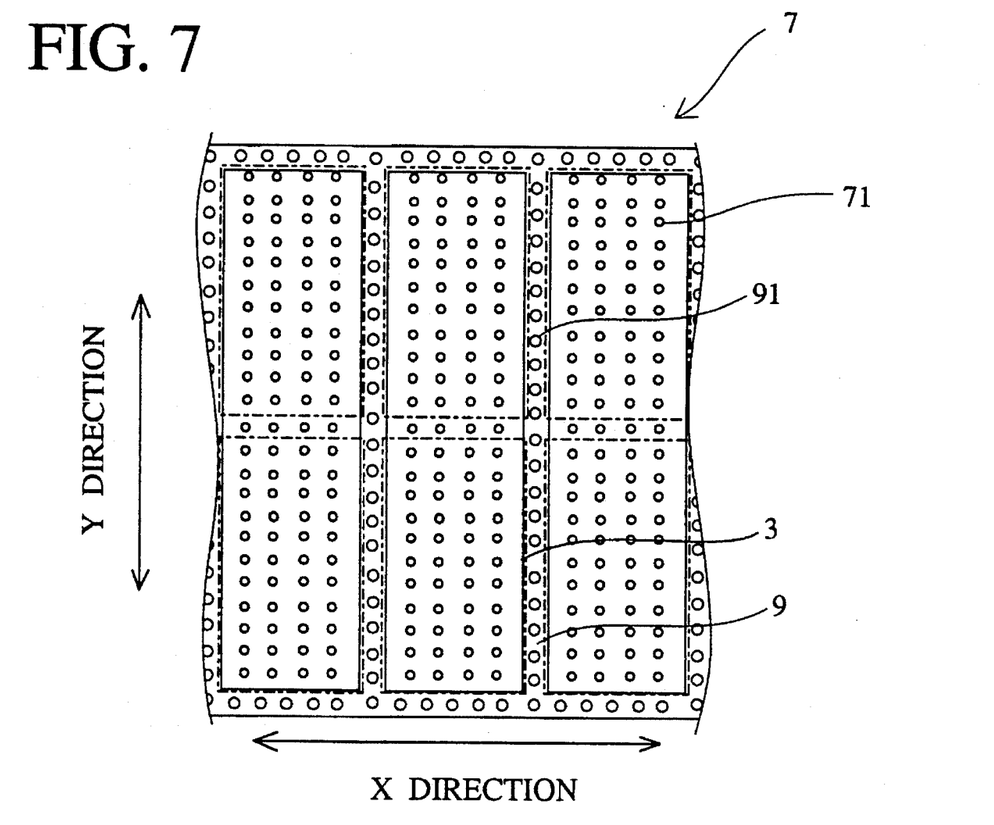
FIG. 7 is a partial plan view showing a partition wall in FIG. 2.
Figure 8:
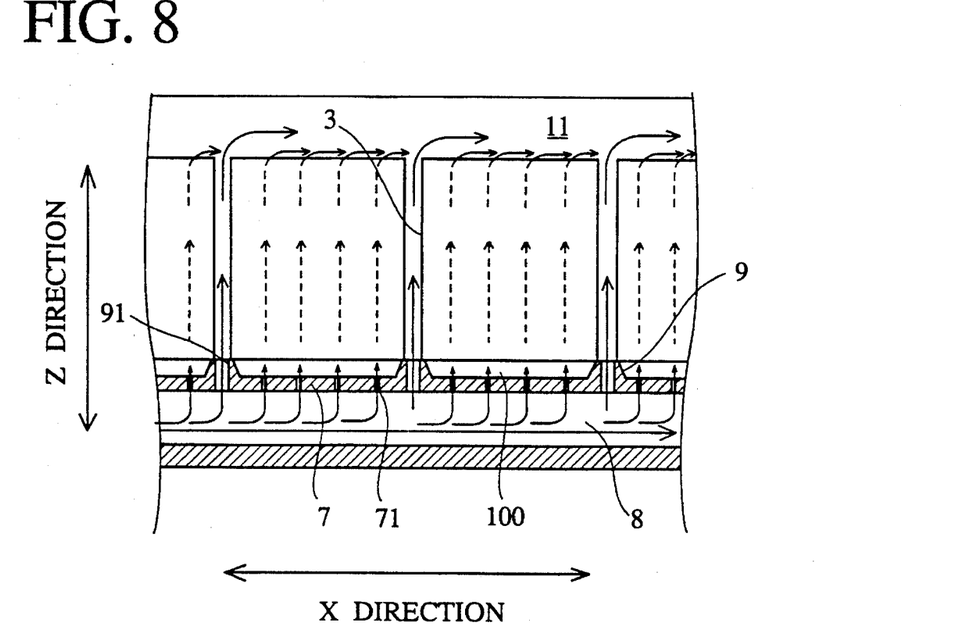
FIG. 8 is a partial enlarged cross-sectional view showing the flow condition of the temperature-controlling medium.
Figure 9:
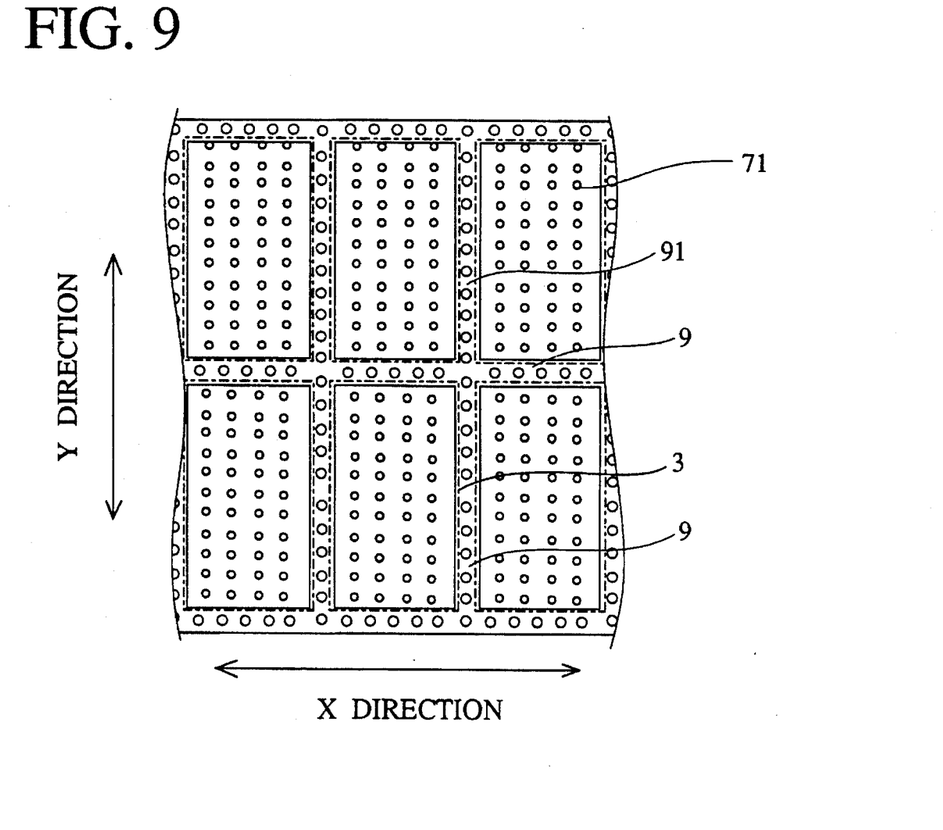
FIG. 9 is a plan view showing the partition wall according to another embodiment of the present invention.

As shown in FIGS. 7 and 8, the partition wall 7 has transverse ridges 9, and there are a large number of pores 71 in a flat portion between adjacent ridges 9. For this structure, the temperature-controlling medium introduced into the chamber 8 flows through the pores 71 into a space defined by the flat portion of the partition wall 7, the adjacent ridges 9 and the bottom of the battery module 3. In this embodiment, the transverse ridge 9 has a plurality of pores 91 in a longitudinally extending center portion. As shown in FIG. 9, the partition wall 7 may further have ridges along the longitudinal direction X, and the longitudinal ridges may have pores arranged in a longitudinal center portion thereof. An area ratio of the pores 71 disposed in the flat portion of the partition wall 7 to the pores 91 disposed in the transverse ridges 9 may be determined to achieve the maximum cooling efficiency of the battery module.

With an example of using a cooling medium as a temperature-controlling medium, the temperature control of the battery will be described in detail below.

Each battery module 3 is supported by edge portions of the top surfaces of the ridges 9 of the partition wall 7 such that a bottom of the battery module 3 does not clog the pores 91. Therefore, there are provided longitudinal gaps and transverse gaps around each battery module 3. As shown in FIG. 8, a space 100 is defined by the flat portion of the partition wall 7, the adjacent ridges 9 and the bottom of the battery module 3, and the pores 71 of the partition wall 7 and the vertical pores 35a of the spacer 35 are open to the space 100.

The cooling medium introduced through the inlet opening 4 flows into the chamber 8, and then flows into the space 100 via the pores 71 of the partition wall 7 as shown by the arrow in FIG. 8. The cooling medium flowing into the space 100 passes through the vertical pores 35a of the spacer 35 thereby cooling each battery cell.

The cooling medium flowing out from the pores 91 of the ridges 9 as shown by the arrow in FIGS. 2 and 8 enters into a transverse gap "y" between the adjacent battery modules 3 and flows upward therethrough, thereby cooling the battery module 3 from sides thereof. Incidentally, the cooling medium flowing into the longitudinal gaps "x" and that flowing out from the intersections of the longitudinal gaps "x" and the transverse gaps "y" are relatively small in amount as compared with all the cooling medium flowing out from the chamber 8.

The cooling medium passing through the vertical pores 35a of the spacers 35 and that passing through the transverse gaps "y" between the battery modules 3 reach an upper space 11 in the battery casing 2, and are caused to flow toward the outlet opening 6 and go out of the battery casing 2 through the outlet opening 6 by the action of the discharging fan 5.

By using the battery modules having spacers 35 and the temperature-controlling apparatus according to the present invention, the temperature-controlling medium passing through the pores 71 flows through a large number of vertical pores 35a of the spacer 35 thereby cooling each battery cell in the battery modules. Therefore, the temperature control of the battery modules is extremely efficient. Also, by providing the ridges 9 with pores 91 as in the above embodiment, the temperature-controlling medium passing through the pores 91 can participate in cooling the battery modules. As a result, each battery module can be efficiently cooled by the present invention.

The present invention has been explained in detail referring to the attached drawings, but it should be noted that any modifications may be made thereto unless they deviate from the scope of the present invention. For instance, the direction of cooling medium flow is not restricted to an upward direction, but it may be a downward direction. Also, as shown in FIG. 9, by providing the partition wall with ridges extending both in a longitudinal direction and in a transverse direction in a checkerboard patter, and by supporting each battery module by the crossing ridges, the battery module can be cooled from all sides thereof as well as from inside by means of the spacers through which the cooling medium flows. Further, with respect to the pores 71 and 91 depicted in the above embodiment, they are not restricted to have round cross sections but may have any cross sections such as triangular, rectangular or slit-like cross sections.

Incidentally, the above embodiment has been explained on a case in which the cooling medium is used. However, in a cold area or in the winter seasons, the heating medium would rather be used. In such a case too, the same procedure can be used by introducing the heating medium through the inlet opening, passing it through the pores of the spacers and the ridges and discharging it through the outlet opening, to prevent the decrease in an initial potential of the wet-type rechargeable battery.

As described above in detail, by combining the battery module comprising a plurality of battery cells and spacers having a large number of vertical pores 35a interposed between adjacent battery cells with the temperature-controlling apparatus of the present invention in which the partition wall has a large number of pores both in ridges and flat portions therebetween, the battery cells in the battery module can be efficiently temperature-controlled from inside as well as from outside of the battery modules.

What is claimed is:

1. A temperature-controlling apparatus for a battery comprising (a) a battery casing provided with an inlet opening for a temperature-controlling medium on a front side thereof and an outlet opening for said temperature-controlling medium on a rear side thereof, (b) a plurality of battery modules having spacers interposed therebetween which are disposed in said battery casing, each spacer having a plurality of vertical pores, and (c) a partition wall disposed in a lower portion of said battery casing for defining a chamber communicating with said inlet opening, said partition wall being provided with transverse ridges for supporting side edge portions of said battery modules, said partition wall having a flat portion having a plurality of pores penetrating said partition wall, whereby said temperature-controlling medium introduced into said battery casing flows through said pores of said partition wall and said vertical pores of said spacers.

2. The temperature-controlling apparatus for a battery according to claim 1, wherein said transverse ridges have a plurality of pores penetrating said partition wall in a longitudinal center portion thereof, whereby said temperature-controlling medium passing through said transverse ridges flows between said battery modules.

3. The temperature-controlling apparatus for a battery according to claim 2, wherein said partition wall further has longitudinal ridges in perpendicular to said transverse ridges, said longitudinal ridges having a plurality of pores penetrating said partition wall in a longitudinal center portion thereof, whereby said temperature-controlling medium passing through said longitudinal ridges also flows between said battery modules.

4. The temperature-controlling apparatus for a battery according to claim 1, wherein said temperature-controlling medium flowing upward through said vertical pores of said spacers and gaps between said battery modules reaches an upper space of said battery casing, through which said temperature-controlling medium flows toward said outlet opening.

5. A temperature-controlling apparatus for a battery comprising, a battery casing provided with an inlet opening for a temperature-controlling medium on one side thereof and an outlet opening for said temperature-controlling medium on an opposite side thereof, a plurality of battery modules disposed in said battery casing, each battery module having a plurality of adjacent battery cells and having spacers interposed between each pair of adjacent battery cells, each spacer having a plurality of vertical pores, and a partition wall disposed in a lower portion of said battery casing for defining a chamber communicating with said inlet opening, said partition wall being provided with upwardly projecting transverse ridges for supporting side edge portions of said battery modules, said partition wall having a flat portion between said ridges and spaced from a bottom surface of each battery module, said flat portion having a plurality of pores vertically penetrating said partition wall, whereby said temperature-controlling medium introduced into said battery casing flows through said pores of said partition wall and said vertical pores of said spacers for substantially uniformly controlling the temperature of all of said battery cells.

6. The temperature-controlling apparatus for a battery according to claim 5, wherein said transverse ridges have a plurality of pores penetrating said partition wall in a longitudinal center portion thereof between adjacent battery modules, whereby said temperature-controlling medium passing through said transverse ridges flows between said battery modules.

7. The temperature-controlling apparatus for a battery according to claim 6, wherein said partition wall further has longitudinal ridges perpendicular to said transverse ridges, said longitudinal ridges having a plurality of pores penetrating said partition wall in a longitudinal center portion thereof between longitudinally adjacent battery modules, whereby said temperature-controlling medium passing through said longitudinal ridges also flows between said battery modules.

8. The temperature-controlling apparatus for a battery according to claim 5, wherein said temperature-controlling medium flowing upward through said vertical pores of said spacers and gaps between said battery modules reaches an upper space of said battery casing, said upper space being connected to said outlet opening for causing said temperature-controlling medium to flow to and through said outlet opening.

* * * * *